US008326104B2

(12) United States Patent
Kachmar

(10) Patent No.: US 8,326,104 B2
(45) Date of Patent: Dec. 4, 2012

(54) LOW SHRINK TELECOMMUNICATIONS CABLE AND METHODS FOR MANUFACTURING THE SAME

(75) Inventor: Wayne M. Kachmar, North Bennington, VT (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 13/333,062

(22) Filed: Dec. 21, 2011

(65) Prior Publication Data

US 2012/0237175 A1 Sep. 20, 2012

Related U.S. Application Data

(63) Continuation of application No. 12/987,600, filed on Jan. 10, 2011, now Pat. No. 8,090,232, which is a continuation of application No. 12/492,788, filed on Jun. 26, 2009, now Pat. No. 7,869,677, which is a continuation of application No. 12/115,374, filed on May 5, 2008, now Pat. No. 7,566,474, which is a continuation of application No. 11/039,122, filed on Jan. 18, 2005, now Pat. No. 7,379,642.

(51) Int. Cl.
*G02B 6/44* (2006.01)
*G02B 6/00* (2006.01)

(52) U.S. Cl. ........ 385/102; 385/100; 385/103; 385/141; 385/144

(58) Field of Classification Search .................. 385/100, 385/101, 102, 103, 104, 105, 106, 107, 108, 385/109, 110, 112, 113, 114, 141, 144; 525/537, 525/439, 444; 427/162, 163.2, 164; 264/1.24, 264/1.29, 1.6, 2.6; 428/357, 375, 383
See application file for complete search history.

(56) References Cited

U.S. PATENT DOCUMENTS 3,991,014 A 11/1976 Kleinschuster
4,067,852 A 1/1978 Calundann
4,078,853 A 3/1978 Kempf et al.
4,083,829 A 4/1978 Calundann et al.
4,130,545 A 12/1978 Calundann
4,161,470 A 7/1979 Calundann
4,318,842 A 3/1982 East et al.
4,460,735 A 7/1984 Froix
4,468,364 A 8/1984 Ide
4,550,976 A 11/1985 Cooper et al.
4,553,815 A 11/1985 Martin
4,623,495 A 11/1986 Degoix et al.
4,693,551 A 9/1987 Blanco et al.
4,723,831 A 2/1988 Johnson et al.
4,728,698 A 3/1988 Isayev et al.
4,730,894 A 3/1988 Arroyo
4,765,712 A 8/1988 Bohannon, Jr. et al.
4,767,183 A 8/1988 Martin
4,778,244 A 10/1988 Ryan
4,781,433 A 11/1988 Arroyo et al.
4,798,443 A 1/1989 Knipe et al.
4,810,834 A 3/1989 Grögl et al.
4,826,278 A 5/1989 Gartside, III et al.
4,835,047 A 5/1989 Isayev et al.

(Continued)

*Primary Examiner* — Brian Healy
(74) *Attorney, Agent, or Firm* — Merchant & Gould P.C.

(57) ABSTRACT

The present disclosure relates to a telecommunications cable having a layer constructed to resist post-extrusion shrinkage. The layer includes a plurality of discrete shrinkage-reduction members embedded within a base material. The shrinkage-reduction members can be made of a liquid crystal polymer. The disclosure also relates to a method for manufacturing telecommunications cables having layers adapted to resist post-extrusion shrinkage.

11 Claims, 8 Drawing Sheets

20
28
26
24
22

U.S. PATENT DOCUMENTS 4,844,575 A 7/1989 Kinard et al.
4,875,757 A 10/1989 Greveling
4,906,066 A 3/1990 Ryan
4,956,039 A 9/1990 Olesen et al.
RE33,459 E 11/1990 Bohannon, Jr. et al.
5,006,402 A 4/1991 Isayev
5,006,403 A 4/1991 Isayev
5,021,475 A 6/1991 Isayev
5,032,433 A 7/1991 Isayev et al.
5,050,957 A 9/1991 Hamilton et al.
5,070,157 A 12/1991 Isayev et al.
5,082,348 A 1/1992 Gartside, III et al.
5,098,177 A 3/1992 Tanaka
5,148,509 A 9/1992 Kannabiran
5,238,638 A 8/1993 Isayev
5,260,380 A 11/1993 Isayev
5,268,225 A 12/1993 Isayev
5,275,877 A 1/1994 Isayev
5,307,843 A 5/1994 Jarrin et al.
5,320,788 A 6/1994 Schneider et al.
5,360,497 A 11/1994 Schneider et al.
5,561,729 A 10/1996 Parris
5,767,198 A 6/1998 Shimizu et al.
5,838,864 A 11/1998 Patel et al.
6,137,936 A 10/2000 Fitz et al.
6,198,865 B1 3/2001 Risch
6,324,324 B1 11/2001 Dixon et al.
6,400,873 B1 6/2002 Gimblet et al.
6,419,402 B1 7/2002 Zimmel
6,459,837 B1 10/2002 Fitz et al.
6,495,764 B1 12/2002 Hori
6,527,986 B2 3/2003 Blyler, Jr. et al.
6,576,166 B1 6/2003 Perrin et al.
6,654,527 B2 11/2003 Sakabe et al.
6,660,182 B2 12/2003 Jester
6,801,695 B2 10/2004 Lanier et al.
7,010,201 B2 3/2006 Risch
7,011,774 B2 3/2006 Risch
7,379,642 B2 5/2008 Kachmar
7,566,474 B2 7/2009 Kachmar
7,869,677 B2 1/2011 Kachmar
8,041,166 B2 * 10/2011 Kachmar ...................... 385/103
8,090,232 B2 * 1/2012 Kachmar ...................... 385/102
8,107,781 B2 * 1/2012 Kachmar et al. .............. 385/105
2002/0025127 A1 2/2002 Graham et al.
2002/0146563 A1 10/2002 Risch
2003/0091307 A1 5/2003 Hurley et al.
2003/0118296 A1 6/2003 Smith
2004/0105636 A1 6/2004 Cottevieille et al.
2005/0147363 A1 7/2005 Chastain et al.
2006/0159407 A1 7/2006 Kachmar
2008/0292254 A1 11/2008 Kachmar
2010/0046894 A1 2/2010 Kachmar
2011/0103755 A1 5/2011 Kachmar
2011/0286707 A1 * 11/2011 Kachmar ...................... 385/113
2012/0106905 A1 * 5/2012 Kachmar ...................... 385/103

* cited by examiner 100
122
120
20
124
Controller
118
108
6B
6B
106
104
102
110
112
6A
6A
116
116
114

140
104
144
200
204
208
206
142
202

LOW SHRINK TELECOMMUNICATIONS CABLE AND METHODS FOR MANUFACTURING THE SAME

CROSS-REFERENCE TO RELATED APPLICATION

This application is a continuation of application Ser. No. 12/987,600, filed Jan. 10, 2011, now U.S. Pat. No. 8,090,232, which is a continuation of application Ser. No. 12/492,788, filed Jun. 26, 2009, now U.S. Pat. No. 7,869,677, which is a continuation of application Ser. No. 12/115,374, filed May 5, 2008, now U.S. Pat. No. 7,566,474, which is a continuation of application Ser. No. 11/039,122, filed Jan. 18, 2005, now U.S. Pat. No. 7,379,642, which applications are incorporated herein by reference in their entirety.

TECHNICAL FIELD

The present disclosure relates generally to low shrink telecommunications cable and to methods for manufacturing low shrink telecommunications cable.

BACKGROUND

A fiber optic cable typically includes: (1) a fiber or fibers; (2) a buffer or buffers that surrounds the fiber or fibers; (3) a strength layer that surrounds the buffer or buffers; and (4) an outer jacket. Optical fibers function to carry optical signals. A typical optical fiber includes an inner core surrounded by a cladding that is covered by a coating. Buffers typically function to surround and protect coated optical fibers. Strength layers add mechanical strength to fiber optic cables to protect the internal optical fibers against stresses applied to the cables during installation and thereafter. Example strength layers include aramid yarn, steel and epoxy reinforced glass roving. Outer jackets provide protection against damage caused by crushing, abrasions, and other physical damage. Outer jackets also provide protection against chemical damage (e.g., ozone, alkali, acids).

It is well known that micro-bending of an optical fiber within a cable will negatively affect optical performance. Shrinkage of the outer jacket of a fiber optic cable can cause axial stress to be applied to the optical fiber, which causes micro-bending of the optical fiber. One cause of jacket shrinkage is thermal contraction caused by decreases in temperature. Another source of shrinkage is post-extrusion shrinkage.

Shrinkage caused by thermal contraction is typically only temporary. The amount of thermal expansion/contraction is dependent upon the coefficients of thermal expansion of the materials involved. In a typical fiber optic cable, the jacket has a higher coefficient of thermal expansion than the fiber. Thus, when the temperature drops due to normal environmental temperature cycling, the jacket may shrink more than the fiber causing stresses to be applied to the fiber. These stresses are typically only temporary since the jacket will expand back to its original size when the temperature returns to normal.

Post-extrusion shrinkage is a by-product of the extrusion process used to manufacture fiber optic cables. Generally, to make a fiber optic cable, an optical fiber is passed through an extrusion die and molten plastic material is extruded about the exterior of the fiber. As the molten plastic exits the extrusion die, the plastic is elongated in the direction of flow and then passed through a cooling bath where the elongated shape of the plastic is set. However, after the shape has been set, the plastic material continues to have "memory" of the pre-elongated shape. Thus, if the cable is later heated, the plastic material will gravitate towards its pre-elongated shape thereby causing post-extrusion axial shrinkage of the cable jacket. As indicated above, cable jacket shrinkage can cause micro-bending of the optical fiber thereby degrading signal quality. Unlike shrinkage caused by thermal contraction, post-extrusion shrinkage of the type described above is permanent.

Post-extrusion shrinkage is a significant problem in the area of optical fiber connectorization. When a connector is mounted to the end of a fiber optic cable, a heat cure epoxy is often used to secure the connector to the jacket and strength layer. When the epoxy is heated during the cure cycle, the cable jacket is also heated thereby causing permanent post-extrusion shrinkage. Post-extrusion shrinkage can also be caused after installation by environmental temperature variations.

SUMMARY

One aspect of the present disclosure relates to a telecommunications cable having a layer adapted to resist post-extrusion shrinkage. In one embodiment, the layer is an outer jacket of the cable.

Another aspect of the present disclosure relates to a method for making a telecommunications cable having a layer adapted to resist post-extrusion shrinkage.

A variety of other aspects are set forth in the description that follows. The aspects relate to individual features as well as to combinations of features. It is to be understood that both the foregoing general description and the following detailed descriptions are exemplary and explanatory only and are not restrictive of the invention as claimed.

DETAILED DESCRIPTION

The present disclosure relates generally to telecommunications cable layers (e.g., jackets, buffers, sheaths, etc.) constructed to resist post-extrusion shrinkage while maintaining flexibility. In one embodiment, the layer comprises a jacket surrounding one or more tight buffered optical fibers. In another embodiment, the layer can comprise an outer jacket that surrounds a copper cable. In still another embodiment, the layer can comprise a buffer tube for a loose-buffered cable. In still another embodiment, the layer comprises a tight buffer layer surrounding one or more optical fibers. While example applications have been listed above, it will be appreciated that layers in accordance with the principles of the present disclosure can be used for any layer of a telecommunications cable where reduced shrinkage and relatively high levels of flexibility are desirable.

Figure 1:
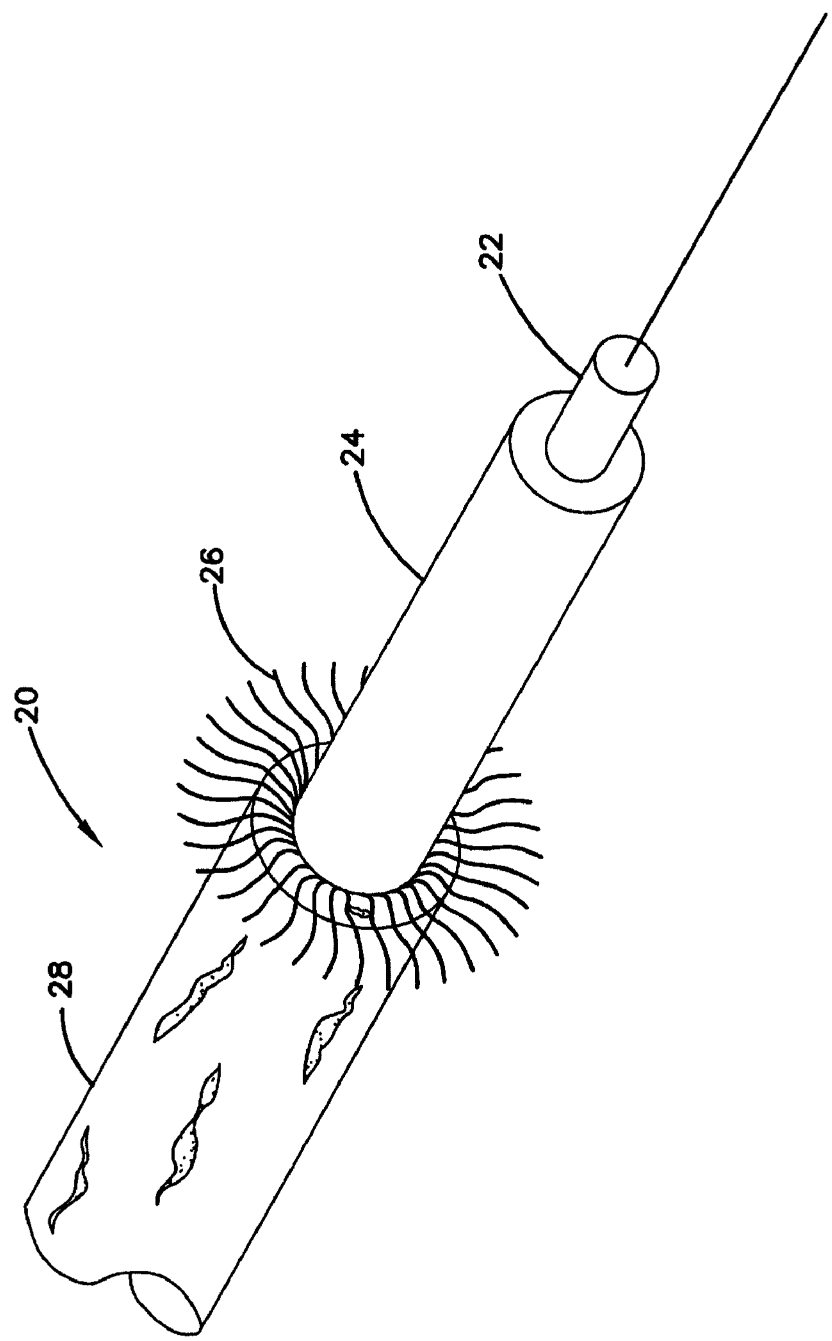
FIG. 1 is a perspective view of an example fiber optic cable in accordance with the principles of the present disclosure.

FIG. 1 illustrates a fiber optic cable 20 that may incorporate one or more shrinkage resistant layers in accordance with the principles of the present disclosure. The fiber optic cable 20 includes an optical fiber 22, a buffer 24, a strength layer 26 and an outer jacket 28. The outer jacket 28 and/or the buffer 24 may have a construction adapted to resist post-extrusion shrinkage.

It will be appreciated that the optical fiber 22 can have any number of conventional configurations. For example, the optical fiber 22 may include a silica-based core surrounded by a silica-based cladding having a lower index of refraction than the core. One or more protective polymeric coatings may surround the cladding. The optical fiber 22 may be a single-mode fiber or a multi-mode fiber. Example optical fibers are commercially available from Corning Inc. of Corning, N.Y.

The buffer 24 is depicted as a tight buffer layer that surrounds the fiber 22. It will be appreciated that the buffer 24 can have any number of conventionally known constructions. For example, the buffer 24 can be made of a polymeric material such as polyvinyl chloride (PVC). Other polymeric materials (e.g., polyethylenes, polyurethanes, polypropylenes, polyvinylidene fluorides, ethylene vinyl acetate, nylon, polyester, or other materials) may also be used. In certain embodiments, the buffer layer may have a construction adapted to resist post-extrusion shrinkage. For example, similar to the outer jacket 28 described below, the buffer can include shrinkage reduction members embedded therein to resist axial shrinkage.

The strength layer 26 is adapted to inhibit axial tensile loading from being applied to the optical fiber 22. The strength layer 26 preferably extends the entire length of the fiber optic cable. In certain embodiments, the strength layer can include yarns, fibers, threads, tapes, films, epoxies, filaments or other structures. In a preferred embodiment, the strength layer 26 includes aramid yarns (e.g., Kevlar® yarns) that extend lengthwise along the entire length of the cable. As depicted in FIG. 1, the strength layer 26 is provided generally at the interface between the buffer 24 and the jacket 28.

Figure 2:
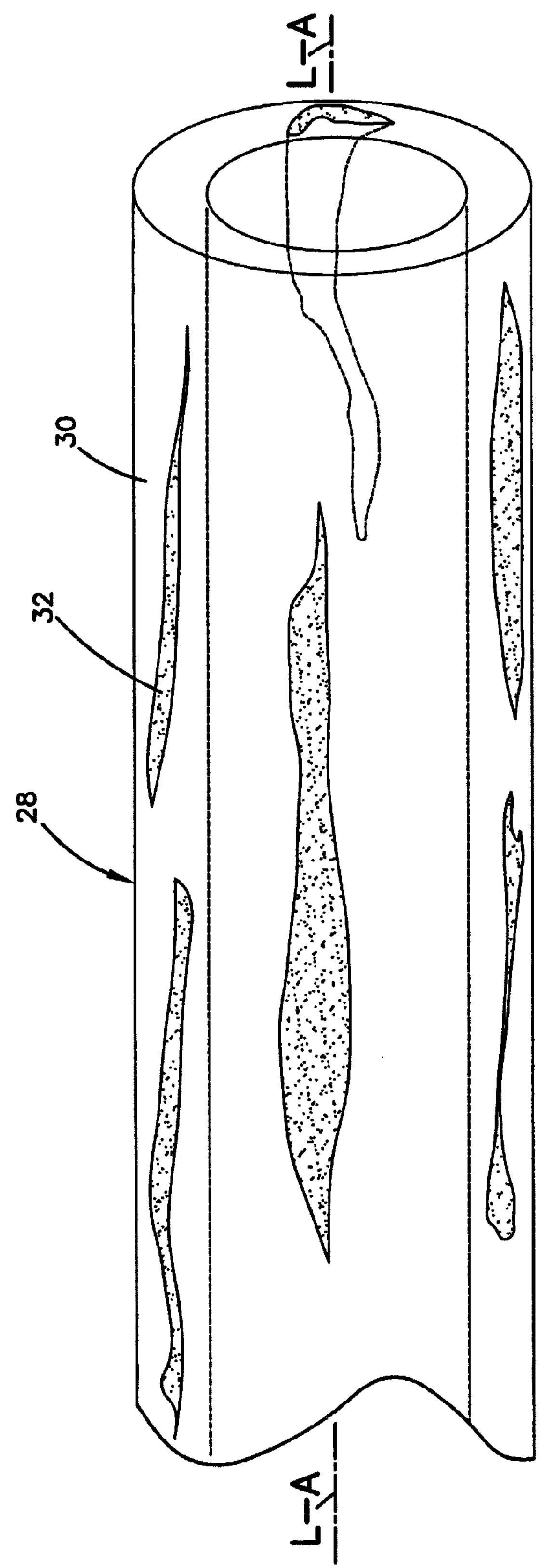
FIG. 2 illustrates a layer of a telecommunications cable having a construction in accordance with the principles of the present disclosure.

Referring to FIG. 2, the jacket 28 has a structure adapted to resist post-extrusion shrinkage. For example, the jacket 28 includes a base material 30 and a plurality of discrete shrinkage-reduction members 32 (e.g., rods, tendrils, extensions, fibers, etc.) embedded within the base material 30. The shrinkage-reduction members 32 are preferably constructed of a material that has better post-extrusion shrink characteristics than the base material 30. As described in the background, when the base material is stretched, the base material retains a memory of the pre-stretched shape and will gravitate towards the pre-stretched shape when reheated. The shrinkage-reduction members preferably demonstrate less shrinkage than the base material when reheated. Because the shrinkage-reduction members are embedded in the base material, the shrinkage-reduction members provide reinforcement that resists shrinkage of the base material. In a preferred embodiment, the shrinkage reduction material has a melting temperature that is greater than the melting temperature of the base material.

Referring still to FIG. 2, the shrinkage-reduction members 32 are preferably elongated and have lengths that are aligned generally parallel to a longitudinal axis L-A of the cable 20. Each of the shrinkage reduction members 32 preferably does not extend the entire length of the cable 20. Instead, each of the members 32 preferably coincides with or extends along only a relatively short segment of the total length of the cable. For example, in one embodiment, at least some of the members 32 have lengths in the range of 0.2 mm-100 mm. In another embodiment, at least some of the members 32 have lengths in the range of 5-60 mm. In still another embodiment, at least some of the members have lengths in the range of about 10-40 mm. In certain embodiments, a majority of the shrinkage reduction members provided within the base material can be within the size ranges provided above, or within other size ranges. Additionally, most of the members 32 are preferably discrete or separate from one another. For example, many of the members 32 are preferably separated or isolated from one another by portions of the base material 30.

To further promote flexibility, the concentration of the shrink-reduction members is relatively small as compared to the base material. For example, in one embodiment, the shrink-reduction material constitutes less than 2% of the total weight of the jacket 28. In another embodiment, the shrink-reduction material constitutes less than 1.5% of the total weight of the jacket 28. In still another embodiment, the shrink-reduction material constitutes less than or equal to 1.25% of the total weight of the jacket 28. In a further embodiment, the shrink-reduction material constitutes less than or equal to 1.0% of the total weight of the jacket 28. While preferred embodiments use less than 2% of the shrink-reduction material by weight, other embodiments within the scope of the present invention can use more than 2% by weight of the shrink-reduction material.

In one embodiment, the base material is a polymer such as a flexible chain polymer (i.e., one in which successive units of the polymer chain are free to rotate with respect to one another, so that the polymer chain can assume a random shape). Example base materials include conventional thermoplastic polymers such as polyethylene, polypropylene, ethylene-propylene, copolymers, polystyrene, and styrene copolymers, polyvinyl chloride, polyamide (nylon), polyesters such as polyethylene terephthalate, polyetheretherketone, polyphenylene sulfide, polyetherimide, polybutylene terephthalate, low smoke zero halogens polyolefins and polycarbonate, as well as other thermoplastic materials. Additives may also be added to the base material. Example additives include pigments, fillers, coupling agents, flame retardants, lubricants, plasticizers, ultraviolet stabilizers or other additives. The base material can also include combinations of the above materials as well as combinations of other materials.

In one embodiment, the shrinkage-reduction members are made from a material that can be softened and reshaped in the extrusion process. In a preferred embodiment, the shrinkage-reduction members include liquid crystal polymers. Example liquid crystal polymers are described in U.S. Pat. Nos. 3,991,014; 4,067,852; 4,083,829; 4,130,545; 4,161,470; 4,318,842; and 4,468,364, which are hereby incorporated by reference in their entireties. Liquid crystal polymers are polymers that are anisotropic and highly oriented, even in a softened or liquid phase.

In one embodiment, the jacket 28 shrinks less than 3% in length when exposed to 110 degrees Celsius for 2 hours in accordance with standard Telcordia test procedures set forth at GR 409 (Generic Reference 409 developed by Telcordia). In another embodiment, the jacket 28 shrinks less than 2% in length, or less than 1% in length, when subjected to the same test. The amount of shrinkage is directly dependent on the amount of liquid crystal polymer used. Typically, when 2% liquid crystal polymer by weight is used, the jacket length shrinks less than 1% on average. The above data is based on tests performed on jackets alone with the fibers and strength members removed prior to shrink-testing.

Figure 3:
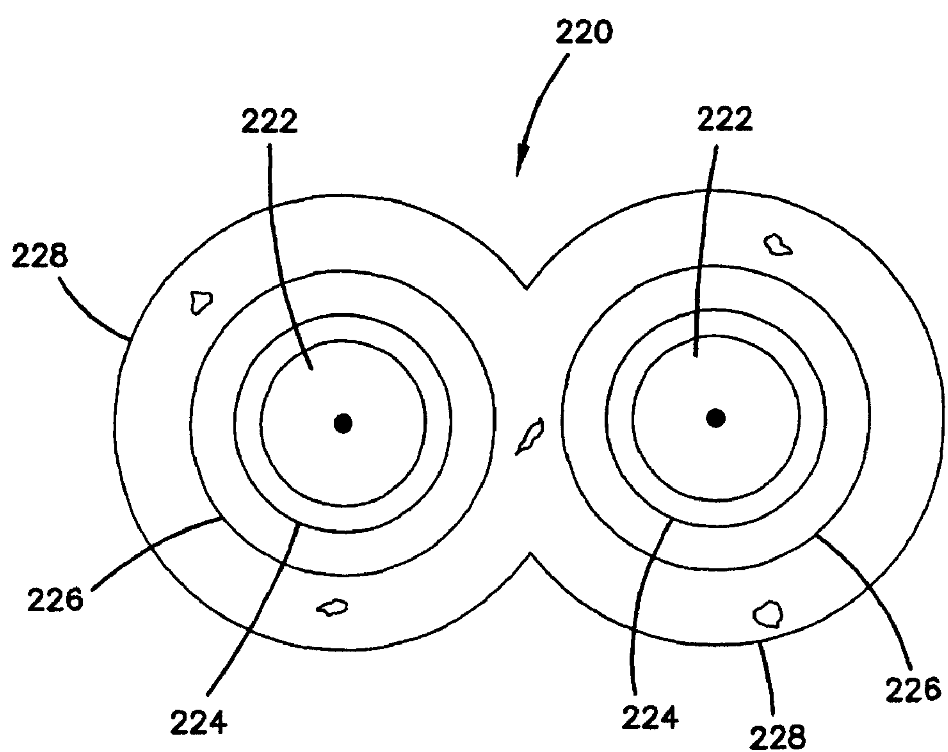
FIG. 3 shows a second example of a fiber optic cable in accordance with the principles of the present disclosure.

FIG. 3 shows a two-fiber zipcord cable 220 having two optical fibers 222, two buffers 224, two aramid strength layers 226, and an outer jacket 228. The outer jacket 228 preferably has a shrink-resistant construction of the type described with respect to the jacket 28 of FIG. 2.

Figure 4:
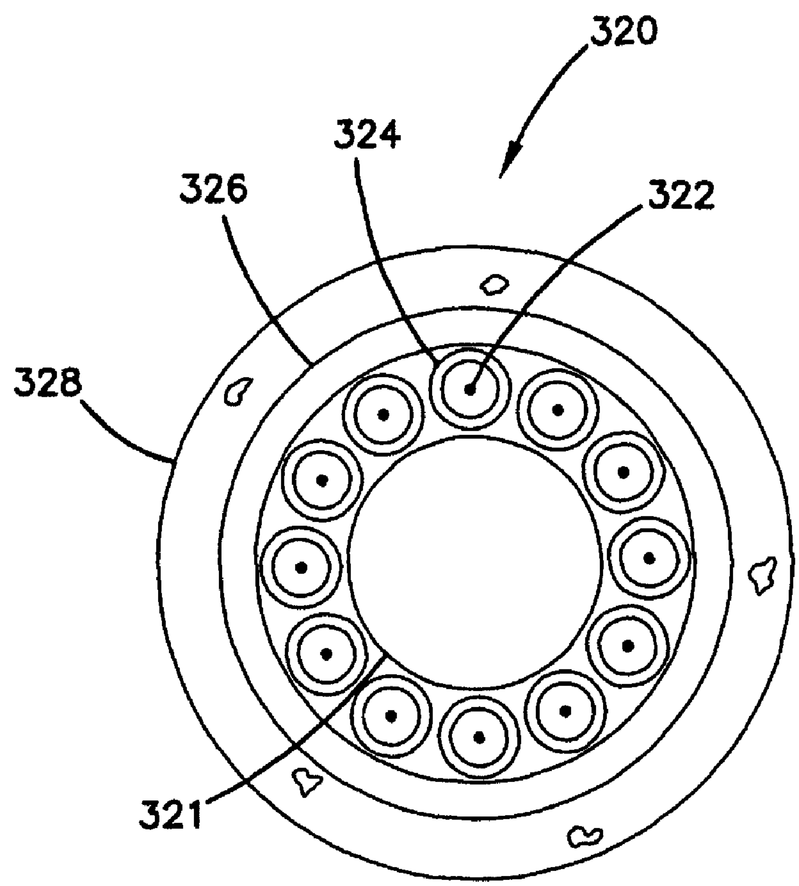
FIG. 4 shows a third example of a fiber optic cable in accordance with the principles of the present disclosure.

FIG. 4 shows a distribution cable 320 having a central strength member 321, a plurality of optical fibers 322, buffers 324 surrounding each of the optical fibers, a tensile strength member 326, and an outer jacket 328. The outer jacket 328 preferably has a shrink-resistant construction of the type described with respect to the jacket 28 of FIG. 2.

Figure 5:
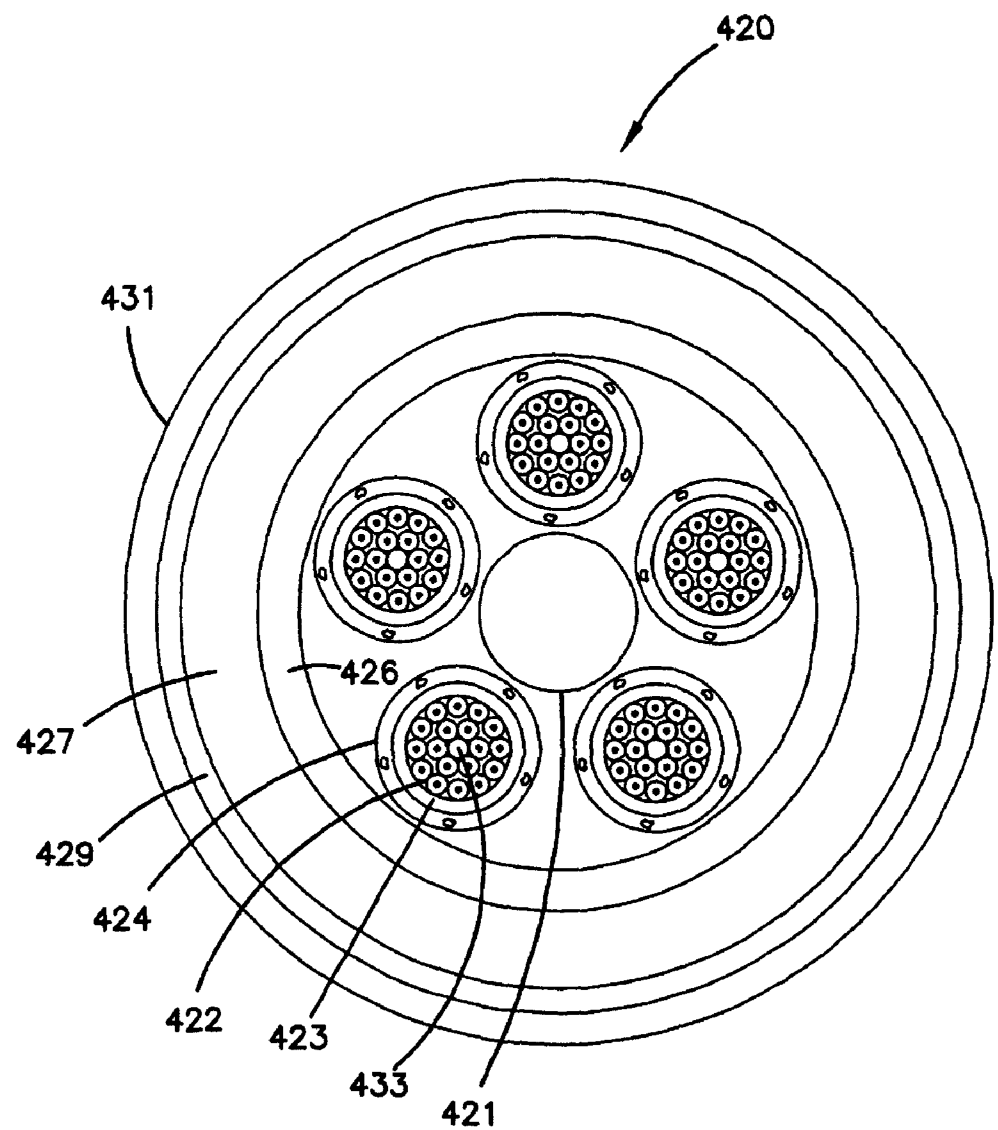
FIG. 5 shows a fourth example of a fiber optic cable in accordance with the principles of the present disclosure.

FIG. 5 shows a loose buffered cable 420 having a central strength member 421, bundles of unbuffered optical fibers 422 contained within buffer tubes 424, a tensile strength layer 426, an inner sheath 427, an optional armor layer 429, and an outer optional sheath 431. Tensile strength layers 423 are also shown between the fibers 422 and the buffer tubes 424. The fibers 422 are arranged around central strength members 433 positioned within the buffer tubes 424. The buffer tubes 424 have a shrink-resistant construction of the type described with respect to the jacket 28 of FIG. 2

Figure 6:
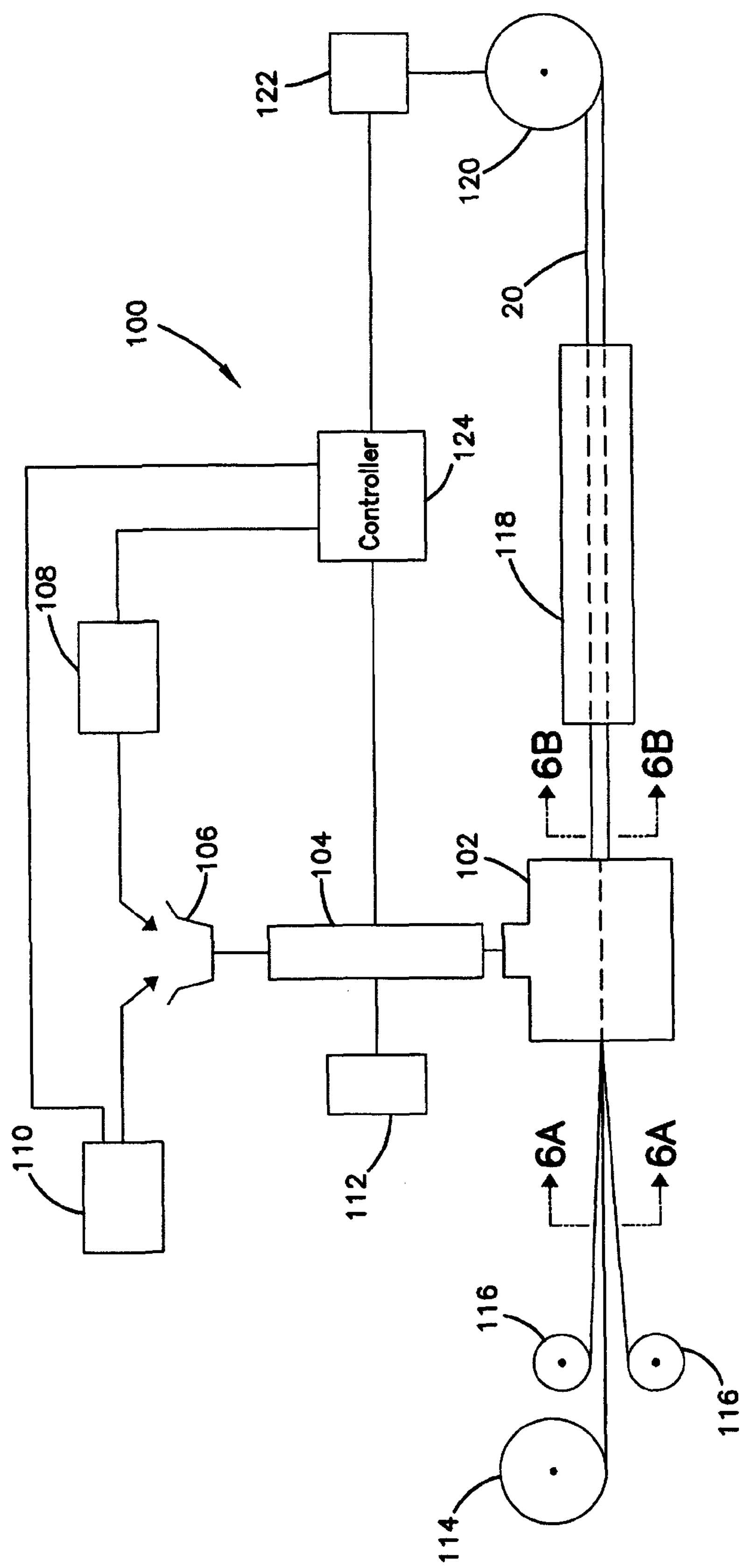
FIG. 6 illustrates a system for manufacturing telecommunications cables in accordance with the principles of the present disclosure.
Figure 6B:
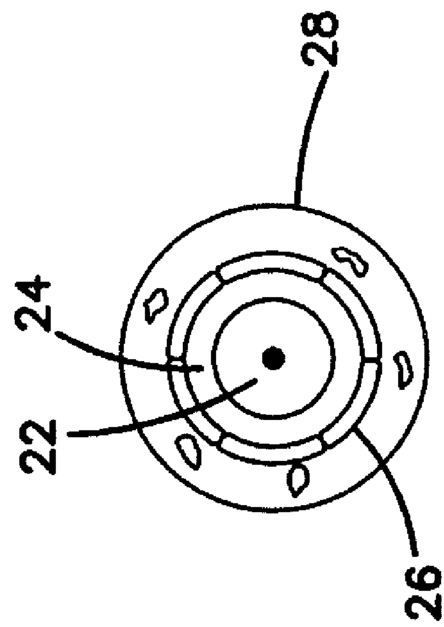
FIG. 6B is a cross-sectional view taken along section line 6B-6B of FIG. 6.
Figure 6A:
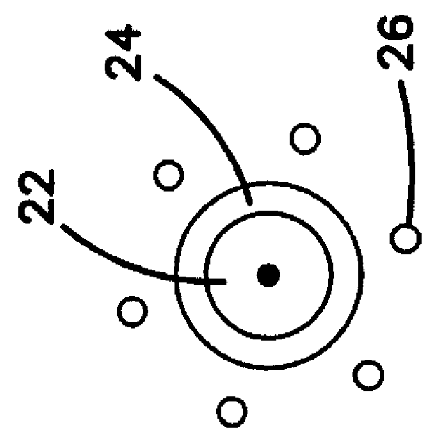
FIG. 6A is a cross-sectional view taken along section line 6A-6A of FIG. 6.

FIG. 6 illustrates a system 100 for making the fiber optic cable 20 of FIG. 1. The system 100 includes a crosshead 102 that receives thermoplastic material from an extruder 104. A hopper 106 is used to feed materials into the extruder 104. A first conveyor 108 conveys the base material to the hopper 106. A second conveyor 110 conveys the shrinkage-reduction material to the hopper 106. The extruder 104 is heated by a heating system 112 that may include one or more heating elements for heating zones of the extruder as well as the crosshead to desired processing temperatures. Buffered optical fiber is fed into the crosshead 102 from a feed roll 114 (see FIG. 6A). Strength members are fed into the crosshead from one or more feed rolls 116 (see FIG. 6A). A water trough 118 is located downstream from the crosshead 102 for cooling the extruded product (see FIG. 6B) that exits the crosshead 102. The cooled final product is stored on a take-up roll 120 rotated by a drive mechanism 122. A controller 124 coordinates the operation of the various components of the system 100.

In use of the system 100, the base material and the shrinkage-reduction material are delivered to the hopper 106 by the first and second conveyors 108, 110, respectively. In certain embodiments, the base material and the shrinkage-reduction material can be delivered to the hopper 106 in pellet form, and the conveyors 108, 110 can include conveyor belts or screw augers. The controller 124 preferably controls the proportions of the base material and the shrinkage-reduction material delivered to the hopper 106. In one embodiment, the shrinkage-reduction material constitutes less than 2% by weight of the total material delivered to the hopper 106. In other embodiments, the shrinkage reduction material constitutes less than 1.5% of the total weight of material delivered to the hopper 106. In still other embodiments, the shrinkage reduction material constitutes less than or equal to 1% of the total weight of material delivered to the hopper 106.

From the hopper 106, the material moves by gravity into the extruder 104. In the extruder 104, the material is mixed, masticated, and heated. In one embodiment, the material is heated to a temperature greater than the melting temperature of the base material, but less than the melting temperature of the shrinkage reduction material. The temperature is preferably sufficiently high to soften the shrinkage-reduction material such that the shrinkage-reduction material is workable and extrudable. The extruder 104 is heated by the heating system 112. The extruder 104 also functions to convey the material to the crosshead 102, and to provide pressure for forcing the material through the crosshead 102.

Figure 7:
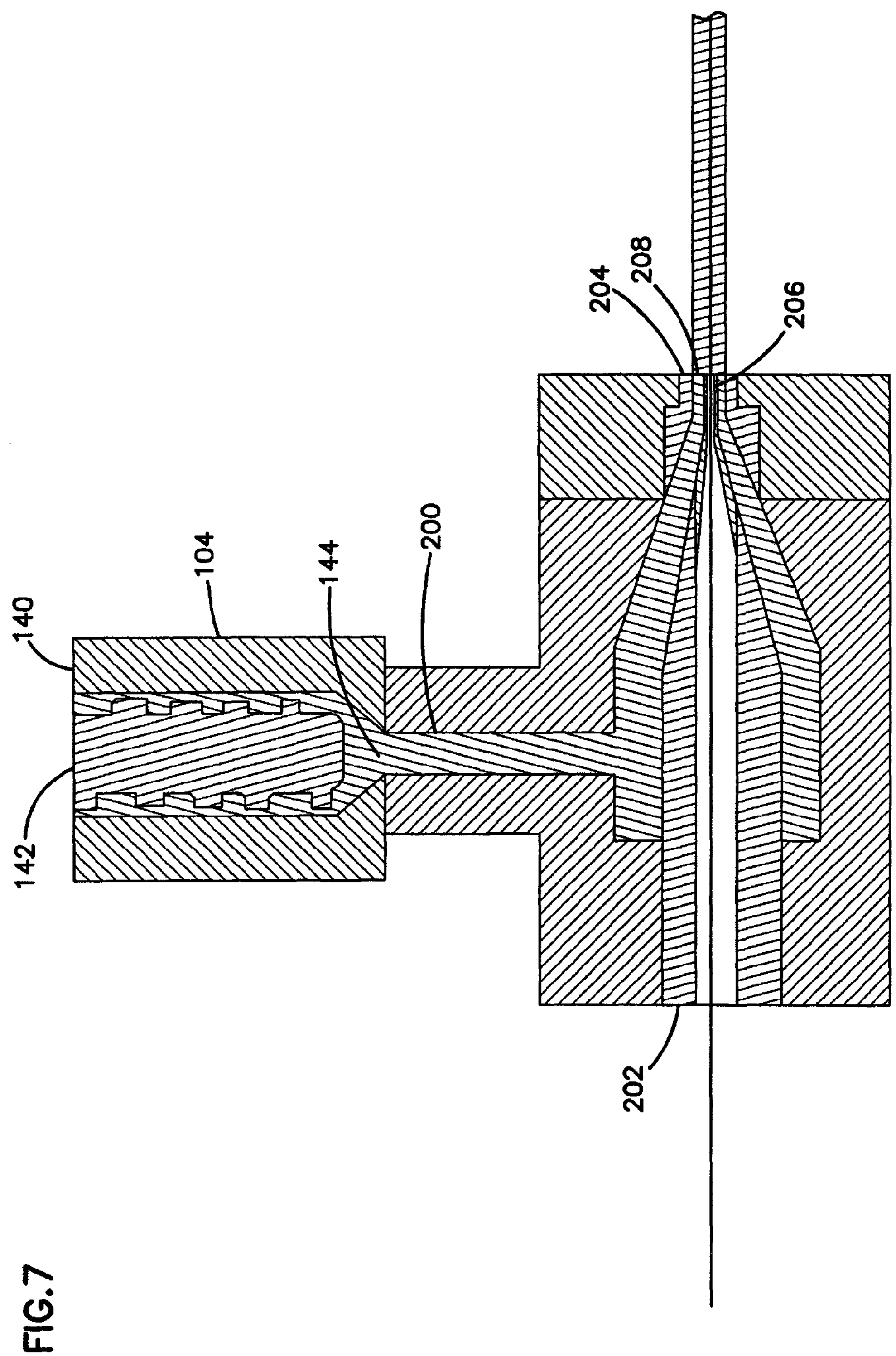
FIG. 7 shows an example crosshead that can be used with the system of FIG. 6.

Referring to FIG. 7, the extruder 104 is depicted as including an extruder barrel 140 and an auger/style extruder screw 142 positioned within the barrel 140. An extruder screen 144 can be provided at the exit end of the extruder 104. The screen 144 prevents pieces too large for extrusion from passing from the extruder into the crosshead 102.

Referring still to FIG. 7, the crosshead 102 includes a jacket material input location 200 that receives thermoplastic material from the extruder 104. The crosshead 102 also includes a tip 202 and a die 204. The tip 202 defines an inner passageway 206 through which the buffered optical fiber and the strength members are fed. The die 204 defines an annular extrusion passage 208 that surrounds the exterior of the tip 202. The crosshead 102 defines an annular passageway for feeding the thermoplastic jacket material to the annular extrusion passage 208. Within the crosshead, the flow direction of the thermoplastic material turns 90 degrees relative to the flow direction of the extruder 104 to align with the buffered fiber.

Within the crosshead 102, the material provided by the extruder 104 is preferably maintained at a temperature greater than the melt temperature of the base material, but less than the melt temperature of the shrinkage reduction material. As the thermoplastic material is extruded through the annular extrusion passage 208, the base material and the shrinkage-reduction material are stretched. This stretching causes reshaping of the shrinkage-reduction material into elongated shrinkage-reduction members having lengths aligned generally along the longitudinal axis of the fiber optic cable. The extruded fiber optic cable is then cooled and shape set at the water trough 118. The extrusion process can be a pressure or semi-pressure extrusion process where product leaves the crosshead at the desired shape, or an annular extrusion process where the product is drawn down after extrusion. After cooling, the product is collected on the take-up roller 120.

EXAMPLES

This invention will now be further described in detail with reference to a specific example. It will be understood that this example provides one embodiment of the invention and is not intended to limit the scope of the invention.

One experimental example used Dow 1638 low smoke zero halogen material as a base material mixed with a liquid crystal polymer such as Ticona Vectra A950. The base material has a melt temperature of 362° F., and the liquid crystal polymer has a melt temperature of 536° F. and a softening temperature of 293° F. The materials were mixed at a ratio of 99% base material and 1% of the liquid crystal polymer. The materials were masticated within a screw extruder and heated to a temperature of 452° F. The materials were then forced through a crosshead including a tip having an outside diameter of 0.062", and a die defining an extrusion opening having an inside diameter of 0.130". The crosshead was heated to a temperature of 500° F. The run speed was 12 meters per minute. The extruded jacket had an exterior diameter of 0.0787" (2.0 mm) and an interior diameter of 0.061" (1.54 mm). The jacket was extruded without an inner optical core. After cooling, the jacket was cut into 150 mm segments and heated to 110 degrees Celsius for 2 hours to test for shrinkage. The testing showed that the jacket segments shrunk less than 2% in length on average based on GR 409 shrink testing.

Another experimental example used Dow 1638 low smoke zero halogen material as a base material mixed with a liquid crystal polymer such as Ticona Vectra A950. The base material has a melt temperature of 362° F., and the liquid crystal polymer has a melt temperature of 536° F. and a softening temperature of 293° F. The materials were mixed at a ratio of 98% base material and 2% of the liquid crystal polymer. The materials were masticated within a screw extruder and heated to a temperature of 475° F. The materials were then forced through a crosshead including a tip having an outside diameter of 0.064", and a die defining an extrusion opening having an inside diameter of 0.127". The crosshead was heated to a temperature of 500° F. The run speed was a high speed run of 143 meters per minute. The extruded jacket had an exterior diameter of 0.0787" (2.0 mm) and an interior diameter of 0.0508" (1.29 mm). The jacket was extruded about an internal optical core. After cooling, the jacket was cut into 150 mm segments and heated to 110 degrees Celsius for 2 hours to test for shrinkage. The testing showed that the jacket segments shrunk less than 1% in length on average based on GR 409 shrink testing. The core was removed for the shrink testing.

Since many embodiments of the invention can be made without departing from the spirit and scope of the invention, the invention resides in the claims hereinafter appended and the broad inventive aspects underlying the specific embodiments disclosed herein.

What is claimed is:

1. A telecommunications cable comprising:

at least one optical fiber having a core surrounded by a cladding and at least one protective coating;

a strength layer for providing the cable with tensile reinforcement surrounding the optical fiber; and an outer jacket surrounding the strength layer, the outer jacket including a thermoplastic base material and a plurality of discrete, elongated shrinkage-reduction members embedded within the thermoplastic base material, the shrinkage-reduction members being aligned generally parallel to a longitudinal axis of the cable, the shrinkage-reduction members having lengths ranging between 0.2 mm and 100 mm, wherein the outer jacket shrinks less than 3% in length when tested separately from the optical fiber for carrying a telecommunications signal by exposing the layer to 110 degrees Celsius for 2 hours.

2. The telecommunications cable of claim 1, further comprising a buffer surrounding the at least one optical fiber, wherein the outer jacket surrounds the buffer.

3. The telecommunications cable of claim 2, wherein the buffer includes a base material and a plurality of shrinkage-reduction members embedded within the base material.

4. The telecommunications cable of claim 3, wherein the shrinkage-reduction members include liquid crystal polymer.

5. The telecommunications cable of claim 3, wherein the base material of the buffer is a material selected from the group consisting of polyvinyl chloride, polyethylene, polyurethane, polypropylene, polyvinylidene fluoride, ethylene vinyl acetate, nylon, and polyester.

6. The telecommunications cable of claim 1, wherein the strength layer is selected from the group consisting of yarns, fibers, threads, tapes, films, epoxies, filaments, and combinations thereof.

7. The telecommunications cable of claim 1, wherein the strength layer includes aramid yarn.

8. The telecommunications cable of claim 1, wherein a majority of the shrinkage-reduction members have lengths in the range of 10-40 mm.

9. The telecommunications cable of claim 1, wherein the outer jacket shrinks less than 2% in length when tested separately from the optical fiber for carrying a telecommunications signal by exposing the layer to 110 degrees Celsius for 2 hours.

10. The telecommunications cable of claim 1, wherein the outer jacket shrinks less than 1% in length when tested separately from the optical fiber for carrying a telecommunications signal by exposing the layer to 110 degrees Celsius for 2 hours.

11. The telecommunications cable of claim 1, wherein the shrinkage-reduction members form less than 2% of a total weight of the outer jacket.

* * * * *